(12) United States Patent
Bachmann

(10) Patent No.: US 7,545,986 B2
(45) Date of Patent: Jun. 9, 2009

(54) ADAPTIVE RESAMPLING CLASSIFIER METHOD AND APPARATUS

(75) Inventor: Charles M. Bachmann, Burke, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 659 days.

(21) Appl. No.: 11/229,436

(22) Filed: Sep. 15, 2005

(65) Prior Publication Data

US 2006/0056704 A1     Mar. 16, 2006

Related U.S. Application Data

(60) Provisional application No. 60/610,863, filed on Sep. 16, 2004.

(51) Int. Cl.
    *G06K 9/62*      (2006.01)
(52) U.S. Cl. ..................................................... 382/224
(58) Field of Classification Search ................. 382/151, 382/159, 181, 218, 224, 276; 707/1–10
See application file for complete search history.

(56) References Cited

U.S. PATENT DOCUMENTS 7,089,241 B1 *    8/2006    Alspector et al. ............... 707/7
7,240,038 B2 *    7/2007    Hitt ............................. 706/12

OTHER PUBLICATIONS

Juang et al, "Discriminative Learning for Minimum Error Classification", IEEE Trans. on Signal Processing, vol. 40, No. 12, pp. 3043-3054 (Dec. 1992).

Gao et al, "Development of a line-by-line-based atomsphere removal algorithm for Airborne and Spaceborne Imaging Spectrometers", SPIE, vol. 3118, pp. 132-141.

Giles M. Foody, "The Significance of Border Training Patterns in Classification by a Feedforward Neural Network Using Back Propagation Learning" Intern'l Journal of Remote Sensing, vol. 20, No. 18, pp. 3549-3562, 1999.

(Continued)

*Primary Examiner*—Daniel G Mariam
(74) *Attorney, Agent, or Firm*—John J. Karasek; L. George Legg

(57) ABSTRACT

According to the invention, an apparatus for classifying and sorting input data in a data stream includes a processor having a classifier input control with a first input and second input, an adaptive classifier, a ground truth data input, a ground truth resampling buffer, a source data re-sampling buffer, and an output. The processor is configured for sampling the input data with the input control, comparing one or more classes of the sampled input data with preset data classifications for determining the degree of mis-classification of data patterns, determining a probability proportional to the degree of mis-classification as a criterion for entry into a resampling buffer, entering data patterns causing mis-classification in a resampling buffer with a probability value proportional to the degree of mis-classification, comparing the data patterns to a ground truth source and aligning the data patterns with their associated data pattern labels employing the same decision outcome based on a mis-classification probability as applied to the resampling buffer to form a set of training data, and updating the adaptive classifier to correlate with the training data. These steps are repeated until a sufficient degree of data classification optimization is realized, with the output being an optimized data stream.

20 Claims, 6 Drawing Sheets

OTHER PUBLICATIONS

Kenji Fukumizu, "Statistical Active Learning in Multilayer Perceptrons", IEEE Trans. om Neural Networks, vol. 11, No. 1, Jan. 2000.

Park et al, "Adaptive On-Line Learning of Optimal Decision Boundary Using Active Sampling" Depart. of Electrical and Computer Engineering, Uinv. of Wisconsin, pp. 253-262, 1996.

Hwang et al, "Query-Based Learning Applied to Partially Trained Multilayer Perceptrons", IEEE TTrans. on Neural Networks, vol. 2, No. 1, pp. 131-136, Jan. 1991.

Yamauchi et al, "An Incremental Learning Method with Relearning of Recalled Interfered Patterns", Depart. of Intelligence and Computer Science, Nagoya Institute of Technology, pp. 243-252, 1996.

* cited by examiner

US 7,545,986 B2

ADAPTIVE RESAMPLING CLASSIFIER METHOD AND APPARATUS

The present application claims the benefit of the priority filing date of provisional patent application No. 60/610,863, filed Sep. 16, 2004, incorporated herein by reference.

FIELD OF THE INVENTION

This invention relates to a method and apparatus for optimizing adaptive classifiers. More particularly, the invention relates to stochastic optimization for hyperspectral image data streams.

BACKGROUND OF THE INVENTION

Stochastically optimized classifiers are widespread in remote sensing applications. From researchers who design their own automatic classification algorithms to those who use commercially available packages such as ENVI (ENVI Users Guide, 2000), stochastic optimization is at the core of many of these algorithms, which include, for example, vector quantization algorithms and neural networks. Many of these algorithms have significant optimization times or are prone to problems with local minima. Some of these problems can be overcome by replacing completely stochastic sampling with a more active sampling strategy, or "active learning."

In one approach termed "active learning", the basic concept is that training in stochastic optimization routines is inherently inefficient, and that selective presentation of patterns within the context of random sampling can lead to faster convergence and, in many instances, better solutions. In (Park and Hu, 1996), it was shown that by choosing samples that lie within a particular distance from current decision boundaries, convergence to the optimal solution is guaranteed, and simple low-dimensional examples were used to prove that their approach could accelerate the rate of convergence for a popular vector quantization known as Learning Vector Quantization (LVQ) (Kohonen, 1997). In the later stages of optimization, their approach is intuitively appealing because it suggests that the majority of errors occur near decision boundaries and that that is where the majority of refinements of the decision boundaries should be concentrated. Nevertheless, although this is better than naive stochastic sampling, it may be too restrictive in the early stages of optimization when the decision boundaries are not necessarily in close proximity to their optimal positions.

In many of the prior art approaches, illustrative data are low dimensional and in some cases artificially constructed. A number of the previous approaches to active learning are also slow, especially for high-dimensional applications such as hyper-spectral imagery. For example, the multi-point search method described in (Fukumizu, 2000) requires an integral over expressions involving second order derivatives (Fisher Information matrices) and is, therefore, significantly more complicated and computationally expensive than the expressions which govern the approach that I have developed. Likewise, some algorithms have been designed around a specific algorithm such as in (Yamauchi, Yamaguchi and Ishii, 1996), in which a complicated scheme of potential pattern interference must also be estimated as the model complexity grows. Similarly, the approach defined in (Hwang et al., 1991) also involves significant computational overhead, primarily from an inversion process which itself is implemented as a stochastic gradient descent algorithm; their approach also uses conjugate pairs of pseudo-patterns which also must be estimated. This inversion process thus requires significant computational overhead, and their entire approach is specific to a particular neural network algorithm.

There is, therefore, a need for a classifier system requiring less computational resources, having faster computational speed, and having greater efficiency than prior art systems.

SUMMARY OF THE INVENTION

According to the invention, an apparatus for classifying and sorting input data in a data stream includes a processor having a first input, for receiving the input data, a second input, and an output. The processor includes a classifier input control with the first input and the second input, an adaptive classifier, a ground truth data input, a ground truth resampling buffer, and a source data re-sampling buffer. The processor is configured for a) sampling the input data with the input control, b) comparing one or more classes of the sampled input data with initially preset data classifications that constitute a baseline for determining mis-classification of data patterns, c) determining the degree of the mis-classification of the input data and assigning a probability proportional to the degree of misclassification as a criterion for entry into a resampling buffer thereto, d) entering data patterns causing mis-classification in a resampling buffer with a probability value proportional to the degree of mis-classification, e) comparing the data patterns to a ground truth source and aligning the data patterns with their associated data pattern labels employing the same decision outcome based on a probability proportional to the degree of misclassification as applied to the resampling buffer to form a set of training data, and f) updating the adaptive classifier to correlate with the training data deriving inputs at each update either from the original source data input stream and associated ground truth or the resampling buffer and its associated ground truth, with relative rates for each data stream set by the user. Steps a)-f) are repeated until a sufficient degree of data classification optimization is realized. The processor output is an optimized data stream.

Also according to the invention is a processing method that includes the above steps a-f, and including repeating steps a-f until a sufficient degree of data classification optimization is realized.

The present invention adopts a generalized approach that leads to fast convergence. The spatial distribution of patterns chosen for a training set impacts the final generalization of statistical classifiers, e.g. as in remote sensing applications. The invention overcomes the bias inherent in other classifiers toward patterns in the class cores by including more border patterns.

The invention in particular provides significant improvements in classifier convergence rate when the dimensionality of the data is high, as in hyperspectral imagery where the dimensionality is typically ~100 dimensions or greater.

High dimensional data sets arise in many application areas such as remote sensing, medical imaging, communications, and data mining. In particular in remote sensing, the need for rapid classification models of imagery is of paramount importance to meet time critical end user objectives in both military and civilian applications. Typical classification products that result are, for example, terrain maps (the example given below), maps of in water constituents and/or bottom type, and classification of man-made objects and targets.

The invention is applicable to the optimization of a broad range of statistical classifiers and can be implemented online, with minimal computational overhead and storage requirements.

Additional features and advantages of the present invention will be set forth in, or be apparent from, the detailed description of preferred embodiments which follows.

DETAILED DESCRIPTION OF THE PREFERRED EMBODIMENTS

The invention is a classifier that detects when patterns cause mis-classification. These patterns will be both patterns near decision boundaries in the final stages of optimization and those that may be further away in the early phase of optimization. In hyper-spectral applications, I typically encounter data that is highly mixed, so I opt for a practical solution that can be implemented online, recognizing that even as I may accelerate convergence of an algorithm, I may still need to revisit patterns that are error-prone more than once. The invention includes an algorithm wherein is defined a resampling buffer that is part of the total input stream along with the regular data stream, e.g. of images or regions of interest, that comprises the training set. Entry into the resampling buffer is determined online as each pattern is processed, a category response determined, and updates performed; this is what I term Adaptive Resampling Strategy for Error-Prone Exemplars ("ARESEPE").

Figure 1:
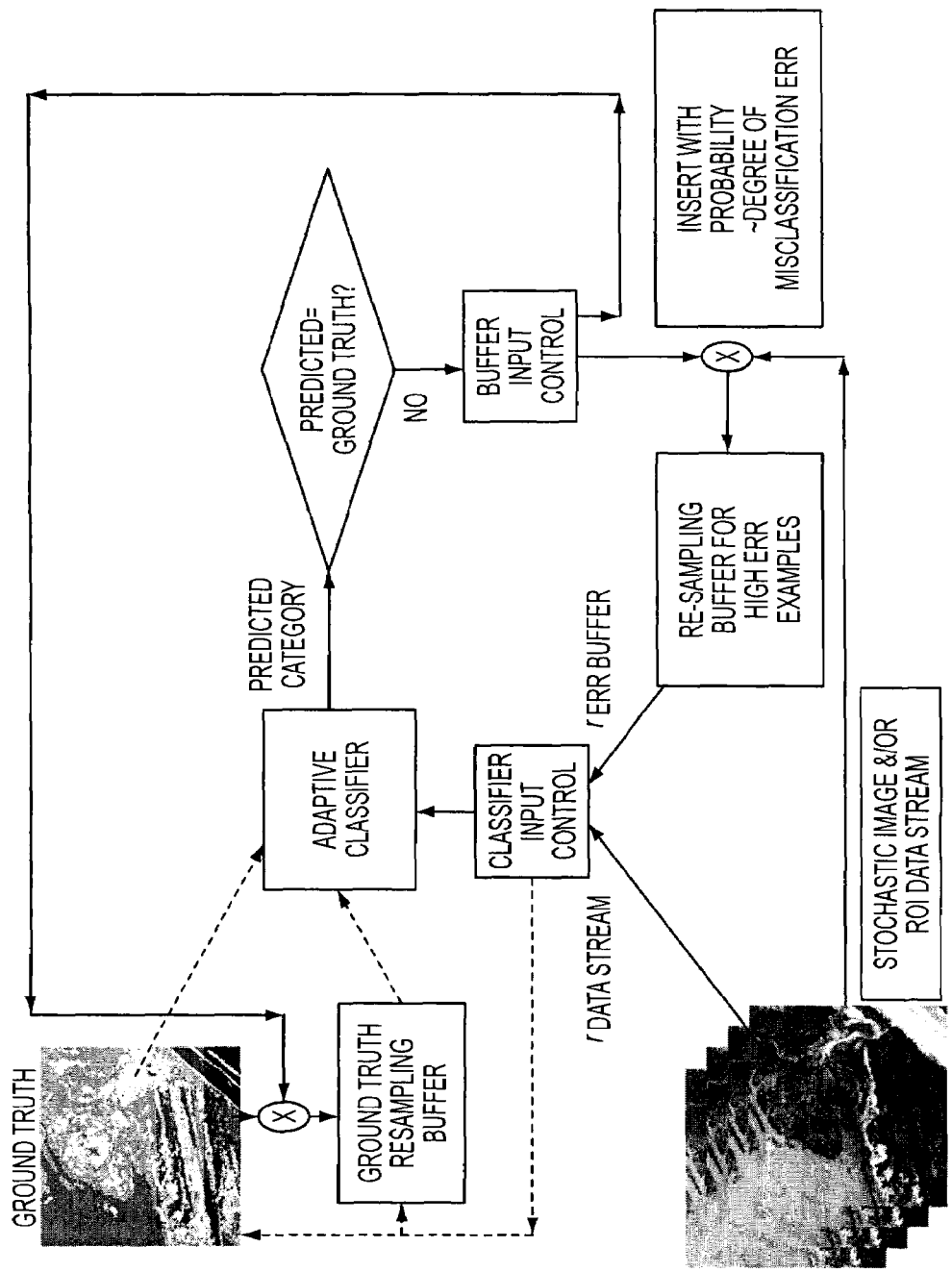
FIG. 1 is a schematic of the ARESEPE processor according to the invention.

Referring now to FIG. 1, ARESEPE processor 10 includes a classifier input control 12 having a first input 13 for receiving an input data stream 14 (which may be images, regions of interest, spectral libraries, and the like) and a second input 15 for receiving data from a resampling buffer 16, where patterns that have caused mis-classification are placed with a probability proportional to their degree of mis-classification. The latter criterion is made more precise in the next sub-section of classifier 10. The input control 12 also serves to toggle a ground truth source 18 or a ground truth resampling buffer 19, associated with the original data stream 14 or the re-sampling buffer 16 respectively, so that samples and their labels remain aligned. The dashed lines from ground truth source 18 and ground truth resampling buffer 19 are employed to indicate that this information is used for updating an adaptive classifier sub-section 20 of processor 10 based on the training data in a general supervised learning scenario. "X"s indicate where a probabilistic gating takes place, for example, samples from the input data stream 14 enter the resampling buffer 16 based on a probability proportional to the degree of misclassification. The same choice is applied simultaneously at the ground truth source 18 for labels entering the ground truth resampling buffer 19 to maintain synchronization of data and labels. The user defines rates for the original data stream 14 ($r_{data\ stream}$) and the resampling buffer error data stream ($r_{err\ buffer}$), and the size of the resampling buffer 16 itself. To date in all of the applications to which I have applied ARESEPE, a modest buffer 16 serves adequately. The buffer 16 is preferably implemented as a first-in-first-out (FIFO) stack, but the input control 12 chooses samples from both the original input data stream 14 and the resampling buffer 16 stochastically with rates of $r_{data\ stream}$ and $r_{err\ buffer}$ respectively. In the Results section, below, I explore the impact of independently varying the buffer size and $r_{err\ buffer}$.

Buffer Entry Criterion: Minimum Mis-Classification Error

As stated above, the buffer entry criterion is determined by the degree of mis-classification. Patterns that do not produce error should not enter the buffer, while those that cause the most error should be the most likely to enter the resampling buffer. The spatial distribution of erroneous patterns in the buffer changes during the optimization procedure. The invention preferably employs a mis-classification measure first defined in "Discriminative Learning for Minimum Error Classification," J. H. Juang, S. Katagiri, IEEE Trans. Sig. Proc., Vol. 40, No. 12, pp 3043-3054, 1992 (Juang and Katagiri, 1992) as an alternative cost function for Least Mean Square (LMS) error stochastic optimization. In this approach, the goal of modeling is to minimize mis-classification error, not the total error between target values and discriminant functions over all categories (LMS error). For discrete classification problems, though closely related, LMS error and mis-classification error are not identical; that is, multiple values of LMS error derived from different models for a specific pattern may map to the same answer (mis-classification or correct classification). For a two class problem with my present approach, the natural measure for degree of mis-classification is the difference between the individual discriminant functions, i.e. just the Bayesian posterior probabilities for sample vector x:

$$d(x)=P(C1|x)-P(C0|x) \tag{1}$$

To extend this to multi-class problems and maintain the idea of a continuously varying function that could be used in stochastic optimization, there is defined an M-category discriminant function:

$$d(x)=-f_i+[(1/(M-1))\Sigma_{j,j\neq i}f_j(x)^v]^{(1/v)} \tag{2}$$

where index i is the true category associated with input sample vector x.

The asymptotic limit as v->∞ is just:

$$d_\infty(x)=f_{max}-f_i \tag{3}$$

where $f_{max}$ is the maximum responding discriminant function not equal to the true discriminant function. Thus a positive value of $d_\infty(x)$ represents the amount by which the winning discriminant function is larger than the true discriminant function.

While originally formulated as an alternative cost function for stochastic optimization of neural networks, the asymptotic minimum misclassification error measure defined in Equation 3 provides a useful measure of the degree of mis-classification for the resampling buffer 16 entry criterion. As patterns are presented alternately from the resampling buffer 16 and the original input data stream 14 (Training Set), whenever a pattern originates from the original data stream, I compute Equation 3. If I calculate the quantity:

$$d_j=f_j-f_i \tag{4}$$

for each category node j, where as before, i is the index of the true category, and then compute $d_{max}$:

$$d_{max} = \max_j d_j = d_\infty(x) \quad (5)$$

then the sign of $d_{max}$ indicates whether the pattern was misclassified and automatically determines the quantity $d_\infty(x)$. If a pattern is misclassified, I make the probability of entering the resampling buffer proportional to $d_{max}$. Note that $d_{max} \in [-1,1]$ if my discriminant functions satisfy the condition $f_i \in [0,1]$. Also included is a baseline acceptance probability. The acceptance probability is thus:

$$P_{accept} = \theta(d_{max})(P_{baseline\ probability} + (d_{max}/\text{scale})*(1-P_{baseline\ probability})) \quad (6)$$

where $d_{max}$ is the Heaviside function (step function). In this equation, scale is usually set to 1, so that the probability of acceptance is $\in [P_{baseline\ probability}, 1]$, however, it can be used to set an upper limit on acceptance probability.

Based on the user-selected values described above, and the processing time selected to run a particular application (examples of which are provided below), ARESEPE processor 10 generates an optimized data output 22 in which both training data and data previously unseen during optimization are classified. In what follows, I provide an example of a hyperspectral scene for which a coastal-land-cover classification map is produced as the output. In the example, the time to train the model on a small subset of known examples is reduced by two orders of magnitude using ARESEPE. The resulting model is then applied to the entire scene of nearly ~1.8 million pixels, producing a highly detailed land-cover classification map.

EXAMPLE

PROBE2 Airborne Hyper-Spectral Imagery

To illustrate ARESEPE, I have chosen a set of airborne hyper-spectral data drawn from a larger scale study. In particular, I evaluate land-cover classification models derived from a PROBE2 hyperspectral scene acquired on Oct. 18, 2001 of Smith Island, Va., a barrier island in The Nature Conservancy's Virginia Coast Reserve (VCR) (LTER website). These multi-season models have been derived for this island and show improvement over single-season models. The database of labeled spectral samples was divided into a Training Set (3632 samples), a Cross-Validation Test Set (1971 samples) used to determine the best model during the optimization, and a Sequestered Test Set (2834 samples) which served as an independent test of generalization capability.

Ground Truth for Smith Island Land-Cover

Ground truth data used to validate the accuracy of these models is based on extensive, ongoing ground surveys with GPS and differential GPS (DGPS) carried out on Smith Island, Va. The Smith Island scene was acquired at 4.5 m resolution with 124 spectral channels, ranging from 440 nm-2486 nm. Scene dimensions are approximately 12.4 km×2.7 km. To obtain reflectance data, the 6S algorithm described in "Development of a line-by-line atmosphere removal algorithm for airborne and spaceborne imaging spectrometers," B. Gao and C. O. Davis, SPIE, Vol. 3118, pp. 132-141 1997 was applied to the radiance data, which was then polished using the EFFORT algorithm described in "Post-ATREM polishing of AVIRIS apparent reflectance data using EFFORT: a lesson in accuracy versus precision," J. Boardman, *Summaries of the Seventh Annual JPL Airborne Geoscience Workshop*, Pasadena, Calif.: JPL, 1998. In the present study, a database of spectral samples from the nineteen categories listed in Table I were extracted from the October PROBE2 scene within areas delimited by the GPS and DGPS ground survey. The categories range from specific plant species to vegetation communities (for species that do not appear in monotypic stands) and cover the majority of the principal wetland, dune, and upland vegetation and related ground cover types.

TABLE I

| | |
|---|---|
| (1) *Phragmites australis* | \|(2) *Spartina alterniflora* |
| (Common Reed) | (Smooth Cordgrass)} |
| (3) *Spartina patens* | (4) *Salicornia virginica* |
| (Salt-Hay) | (Perrenial Glasswort) |
| (5) *Borrichia frutescens* | (6) *Juncus roemerianus* |
| (Sea Ox-eye) | (Needle Rush) |
| (7) Water | \|(8) *Distichlis spicata* (Saltgrass) |
| (9) *Scirpus* spp. (Saltmarsh Bulrush) | (10) "Wrack" |
| (11) Mudflat/saltflat | (12) *Ammophila breviligulata* |
| | (American Beachgrass) |
| (13) Beach/sand | (14) *Uniola paniculata* (Sea-oats) |
| (15) *Andropogon* spp. | (16) *Myrica cerifera* |
| (Broomsedge) | (Bayberry)-dominated Thicket} |
| (17) Pine/hardwood complex | (18) Peat Outcrop |
| (19) *Iva frutescens* (Marsh-elder) | |

Results

In order to illustrate ARESEPE, I chose a popular neural network algorithm, the backward propagation algorithm described in "Learning Internal Repreentations by Error Propagation," D. E. Rumelhart, G. E. Hinton, and R. J. Williams, *Parallel Distributed Processing, Explorations in the Microstructure of Cognition, Vol. 1: Foundations*, D. E. Rumelhart and J. L. McClelland, Ed., Cambridge, Mass.: The MIT Press, 1986, pp. 318-362 ("Rumelhart"). Two different BP cost functions were evaluated: one using a cross-entropy (BPCE) described in "Neural Network Classifiers Estimate Bayesian a posteriori Probabilities," M. D. Richard and R. P. Lippman, *Neural Computation*, vol. 3, pp. 461-483, 1991 ("Richard and Lippman"), and the other the LMS (Rumelhart). The primary control parameters associated with ARESEPE were varied and performance was compared against BPLMS and BPCE without ARESEPE. Tables II-IV (BPCE) and V-VII (BPLMS), show that the convergence rate of the overall accuracy is improved steadily as $r_{err\ buffer}$ is increased ($r_{err\ buffer} = 0.0$ is without ARESEPE) for the Training, Cross-Validation, and Sequestered Test sets.

TABLE II

Training Set: % Accuracy vs Updates(Samples)
BPCE, $P_{baseline\ probability}$ = 0.5, Buffer Size = 3600
Varying $r_{err\_buffer}$ (0.0-0.9)

| Updates | 0.0 | 0.1 | 0.25 | 0.35 | 0.5 | 0.75 | 0.9 |
|---|---|---|---|---|---|---|---|
| 0.0e+00 | 6.39 +/− 5.06 | 6.54 +/− 4.40 | 7.26 +/− 4.68 | 4.18 +/− 3.52 | 6.53 +/− 5.13 | 4.68 +/− 4.11 | 5.36 +/− 4.66 |
| 5.0e+04 | 5.58 +/− 4.38 | 4.20 +/− 2.77 | 12.17 +/− 7.35 | 14.56 +/− 8.75 | 19.01 +/− 10.99 | 30.63 +/− 8.54 | 39.38 +/− 6.87 |
| 1.0e+05 | 7.76 +/− 4.50 | 9.58 +/− 4.76 | 20.99 +/− 7.35 | 27.02 +/− 7.48 | 28.09 +/− 11.23 | 45.22 +/− 6.24 | 49.76 +/− 6.33 |
| 2.5e+05 | 14.15 +/− 7.26 | 27.32 +/− 10.09 | 37.61 +/− 5.49 | 44.67 +/− 6.31 | 47.39 +/− 8.75 | 65.36 +/− 6.16 | 68.44 +/− 4.21 |
| 5.0e+05 | 27.44 +/− 5.84 | 38.56 +/− 6.29 | 44.80 +/− 9.26 | 53.00 +/− 5.55 | 63.21 +/− 9.83 | 75.17 +/− 4.95 | 80.45 +/− 3.29 |
| 7.5e+05 | 33.78 +/− 7.39 | 39.71 +/− 7.36 | 54.56 +/− 6.30 | 65.48 +/− 11.47 | 73.70 +/− 4.92 | 81.10 +/− 2.70 | 86.32 +/− 2.16 |
| 1.0e+06 | 32.77 +/− 8.61 | 45.81 +/− 4.23 | 63.16 +/− 6.50 | 71.78 +/− 6.99 | 79.94 +/− 3.13 | 85.37 +/− 2.43 | 88.29 +/− 2.82 |
| 2.5e+06 | 38.68 +/− 4.61 | 57.31 +/− 7.63 | 80.92 +/− 2.79 | 86.13 +/− 4.49 | 90.12 +/− 2.06 | 95.07 +/− 1.45 | 97.05 +/− 0.46 |
| 5.0e+06 | 43.15 +/− 10.01 | 75.04 +/− 7.28 | 89.88 +/− 2.18 | 94.47 +/− 1.77 | 96.30 +/− 1.43 | 98.82 +/− 0.32 | 99.30 +/− 0.38 |
| 7.5e+06 | 46.50 +/− 9.59 | 79.07 +/− 5.02 | 95.76 +/− 1.22 | 97.13 +/− 0.86 | 98.56 +/− 0.71 | 99.57 +/− 0.23 | 99.77 +/− 0.11 |
| 1.0e+07 | 52.98 +/− 6.33 | 84.18 +/− 4.07 | 97.64 +/− 1.00 | 98.65 +/− 0.71 | 99.30 +/− 0.37 | 99.81 +/− 0.06 | 99.84 +/− 0.07 |
| 2.5e+07 | 63.85 +/− 8.84 | 97.71 +/− 1.08 | 99.72 +/− 0.15 | 99.83 +/− 0.07 | 99.87 +/− 0.05 | 99.89 +/− 0.03 | 99.89 +/− 0.04 |
| 5.0e+07 | 70.72 +/− 7.59 | 99.71 +/− 0.14 | 99.86 +/− 0.04 | 99.88 +/− 0.03 | 99.90 +/− 0.03 | 99.90 +/− 0.03 | 99.89 +/− 0.04 |
| 1.0e+08 | 79.86 +/− 7.45 | 99.90 +/− 0.02 | 99.90 +/− 0.03 | 99.89 +/− 0.02 | 99.91 +/− 0.03 | 99.90 +/− 0.04 | 99.89 +/− 0.04 |
| 1.2e+08 | 79.60 +/− 7.28 | 99.90 +/− 0.03 | 99.90 +/− 0.03 | 99.90 +/− 0.03 | 99.90 +/− 0.03 | 99.90 +/− 0.03 | 99.90 +/− 0.04 |

TABLE III

Cross-Validation Set: % Accuracy vs Updates(Samples)
BPCE,, $P_{baseline\ probability}$ = 0.5, Buffer Size = 3600
Varying $r_{err\_buffer}$ (0.0-0.9)

| Updates | 0.0 | 0.1 | 0.25 | 0.35 | 0.5 | 0.75 | 0.9 |
|---|---|---|---|---|---|---|---|
| 0.0e+00 | 8.60 +/− 10.77 | 5.12 +/− 4.75 | 7.46 +/− 8.48 | 2.62 +/− 2.90 | 10.24 +/− 12.20 | 3.49 +/− 3.21 | 4.74 +/− 8.09 |
| 5.0e+04 | 3.53 +/− 4.22 | 4.10 +/− 4.62 | 16.78 +/− 15.29 | 17.95 +/− 13.06 | 21.95 +/− 15.35 | 35.84 +/− 10.21 | 50.03 +/− 6.09 |
| 1.0e+05 | 7.39 +/− 7.39 | 12.13 +/− 10.98 | 26.96 +/− 14.27 | 33.70 +/− 15.29 | 35.63 +/− 17.06 | 53.18 +/− 5.37 | 56.06 +/− 7.36 |
| 2.5e+05 | 18.54 +/− 13.25 | 34.16 +/− 17.90 | 46.72 +/− 10.04 | 49.52 +/− 13.39 | 52.38 +/− 10.16 | 65.14 +/− 4.29 | 66.71 +/− 5.79 |
| 5.0e+05 | 37.60 +/− 10.41 | 46.35 +/− 6.76 | 52.99 +/− 10.81 | 57.48 +/− 4.11 | 63.91 +/− 7.93 | 70.79 +/− 2.97 | 73.16 +/− 2.72 |
| 7.5e+05 | 41.02 +/− 12.30 | 48.44 +/− 7.97 | 58.84 +/− 5.16 | 66.26 +/− 9.33 | 67.96 +/− 3.27 | 74.03 +/− 3.01 | 75.91 +/− 1.75 |
| 1.0e+06 | 41.98 +/− 12.11 | 52.67 +/− 2.66 | 65.00 +/− 4.84 | 67.23 +/− 4.69 | 71.93 +/− 2.16 | 76.37 +/− 2.14 | 76.29 +/− 2.09 |
| 2.5e+06 | 49.80 +/− 6.66 | 62.74 +/− 6.74 | 72.81 +/− 3.18 | 75.04 +/− 3.55 | 77.07 +/− 2.24 | 79.21 +/− 1.63 | 78.46 +/− 2.54 |
| 5.0e+06 | 48.46 +/− 8.35 | 69.84 +/− 5.29 | 77.19 +/− 2.82 | 77.07 +/− 1.14 | 78.84 +/− 1.50 | 80.15 +/− 1.15 | 78.45 +/− 1.63 |
| 7.5e+06 | 53.32 +/− 8.23 | 73.24 +/− 3.41 | 78.99 +/− 1.62 | 78.21 +/− 2.68 | 78.71 +/− 2.24 | 79.52 +/− 1.69 | 78.65 +/− 1.92 |
| 1.0e+07 | 56.37 +/− 5.29 | 74.27 +/− 2.55 | 79.69 +/− 1.44 | 79.30 +/− 1.96 | 79.42 +/− 1.50 | 80.11 +/− 1.42 | 78.85 +/− 1.89 |
| 2.5e+07 | 65.83 +/− 8.18 | 79.64 +/− 1.62 | 80.70 +/− 1.19 | 80.34 +/− 1.41 | 79.90 +/− 1.00 | 79.89 +/− 1.09 | 79.35 +/− 1.50 |
| 5.0e+07 | 68.42 +/− 4.31 | 80.81 +/− 1.18 | 81.21 +/− 0.81 | 80.69 +/− 1.29 | 79.89 +/− 1.04 | 80.18 +/− 1.24 | 79.49 +/− 1.35 |
| 1.0e+08 | 74.43 +/− 5.40 | 81.48 +/− 1.10 | 81.26 +/− 0.67 | 80.97 +/− 0.88 | 80.19 +/− 1.10 | 80.33 +/− 1.14 | 79.76 +/− 1.40 |
| 1.2e+08 | 73.39 +/− 7.13 | 81.24 +/− 1.10 | 81.23 +/− 0.73 | 80.93 +/− 0.97 | 80.08 +/− 0.99 | 80.42 +/− 1.16 | 79.91 +/− 1.37 |

TABLE IV

Sequestered Test: % Accuracy vs Updates(Samples)
BPCE,, $P_{baseline\ probability}$ = 0.5, Buffer Size = 3600
Varying $r_{err\_buffer}$ (0.0-0.9)

| Updates | 0.0 | 0.1 | 0.25 | 0.35 | 0.5 | 0.75 | 0.9 |
|---|---|---|---|---|---|---|---|
| 0.0e+00 | 7.15 +/− 6.16 | 4.52 +/− 2.97 | 5.87 +/− 4.48 | 4.74 +/− 3.22 | 5.87 +/− 4.48 | 4.61 +/− 4.71 | 5.31 +/− 4.37 |
| 5.0e+04 | 4.16 +/− 3.21 | 4.89 +/− 4.74 | 12.11 +/− 9.31 | 14.80 +/− 9.28 | 12.11 +/− 9.31 | 27.91 +/− 7.35 | 33.85 +/− 5.30 |
| 1.0e+05 | 7.42 +/− 4.60 | 9.47 +/− 8.38 | 19.81 +/− 7.45 | 24.93 +/− 9.24 | 19.81 +/− 7.45 | 38.37 +/− 4.51 | 42.19 +/− 4.59 |
| 2.5e+05 | 16.07 +/− 7.58 | 25.30 +/− 11.58 | 33.89 +/− 4.06 | 35.90 +/− 6.35 | 33.89 +/− 4.06 | 49.34 +/− 6.26 | 52.63 +/− 5.15 |
| 5.0e+05 | 28.24 +/− 5.22 | 35.17 +/− 4.14 | 40.12 +/− 6.92 | 41.63 +/− 3.63 | 40.12 +/− 6.92 | 56.68 +/− 4.41 | 60.77 +/− 3.06 |
| 7.5e+05 | 31.14 +/− 6.37 | 37.75 +/− 6.54 | 43.65 +/− 3.82 | 50.57 +/− 8.14 | 43.65 +/− 3.82 | 62.29 +/− 2.40 | 63.72 +/− 1.27 |
| 1.0e+06 | 33.12 +/− 7.53 | 40.68 +/− 3.23 | 48.52 +/− 4.90 | 56.12 +/− 5.47 | 48.52 +/− 4.90 | 64.18 +/− 2.47 | 64.72 +/− 1.15 |
| 2.5e+06 | 36.14 +/− 2.43 | 48.05 +/− 5.30 | 61.64 +/− 2.97 | 63.37 +/− 2.37 | 61.64 +/− 2.97 | 67.71 +/− 1.51 | 67.18 +/− 1.84 |
| 5.0e+06 | 38.77 +/− 5.68 | 60.03 +/− 5.57 | 65.11 +/− 2.75 | 67.58 +/− 2.40 | 65.11 +/− 2.75 | 68.32 +/− 1.59 | 68.00 +/− 1.26 |
| 7.5e+06 | 43.21 +/− 5.06 | 61.73 +/− 3.96 | 68.68 +/− 1.83 | 67.50 +/− 1.61 | 68.68 +/− 1.83 | 67.78 +/− 1.14 | 68.27 +/− 1.21 |
| 1.0e+07 | 46.37 +/− 7.83 | 63.34 +/− 3.04 | 68.32 +/− 2.37 | 67.51 +/− 1.25 | 68.32 +/− 2.37 | 68.03 +/− 1.47 | 68.06 +/− 0.94 |
| 2.5e+07 | 52.77 +/− 6.29 | 68.43 +/− 1.69 | 69.45 +/− 1.85 | 68.52 +/− 1.38 | 69.45 +/− 1.85 | 68.61 +/− 1.64 | 68.57 +/− 1.28 |
| 5.0e+07 | 57.05 +/− 3.79 | 69.53 +/− 1.07 | 69.71 +/− 0.91 | 69.08 +/− 1.76 | 69.71 +/− 0.91 | 68.88 +/− 1.85 | 68.79 +/− 1.27 |
| 1.0e+08 | 62.91 +/− 4.13 | 70.29 +/− 1.47 | 70.04 +/− 1.41 | 69.39 +/− 1.69 | 70.04 +/− 1.41 | 69.06 +/− 1.54 | 68.99 +/− 1.35 |
| 1.2e+08 | 63.36 +/− 4.26 | 70.52 +/− 1.63 | 70.24 +/− 1.36 | 69.45 +/− 1.56 | 70.06 +/− 1.13 | 69.18 +/− 1.68 | 69.08 +/− 1.36 |

Figure 2A:
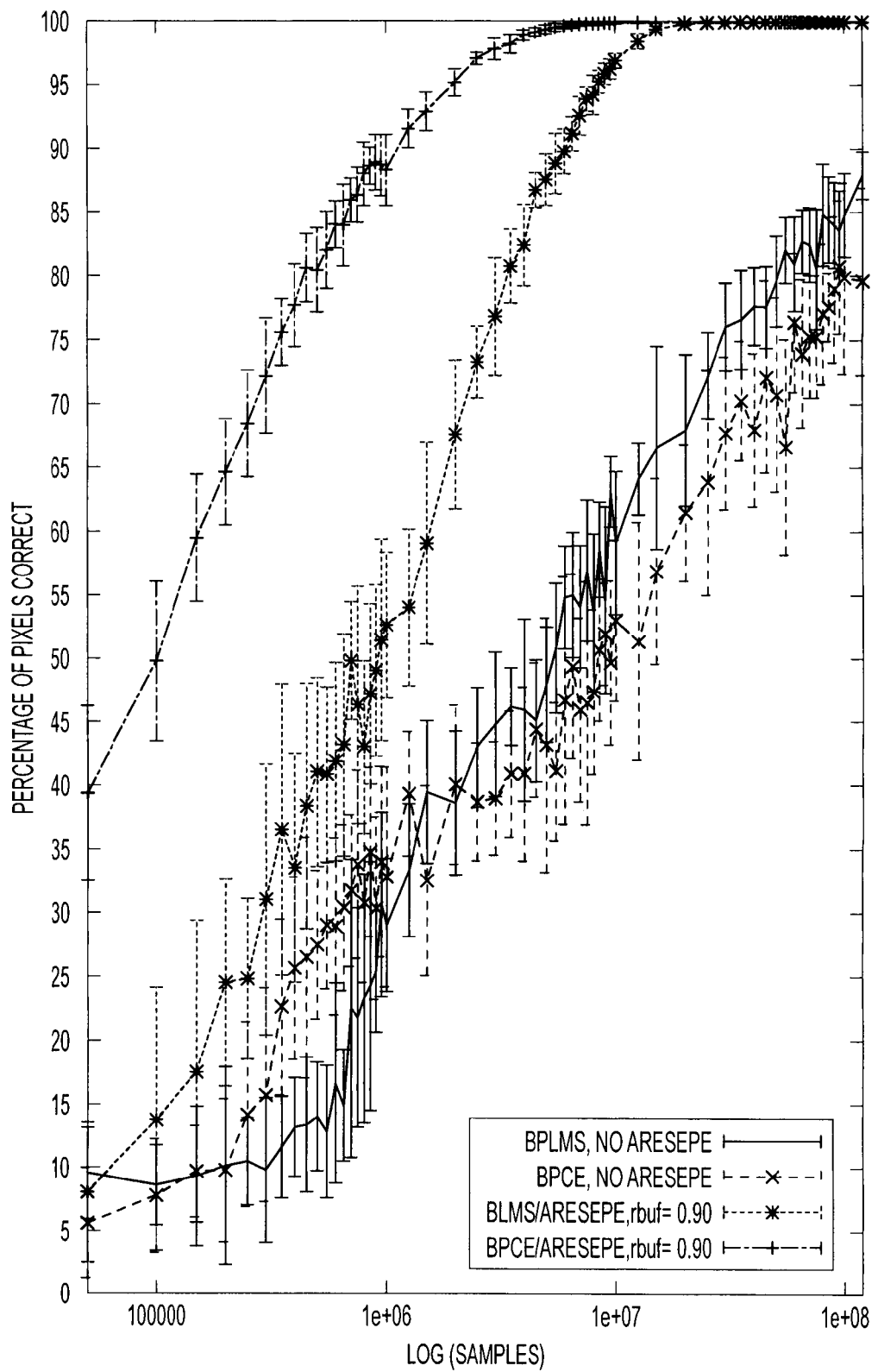
FIG. 2 is a graph comparing the classification performance of stochastically optimized statistical classifiers with and without the use of the ARESEPE method demonstrating two orders of magnitude improvement in rate of convergence when ARESEPE is used for optimizing classifiers of high-dimensional data, in this case for hyperspectral imagery, according to the invention.
Figure 2B:
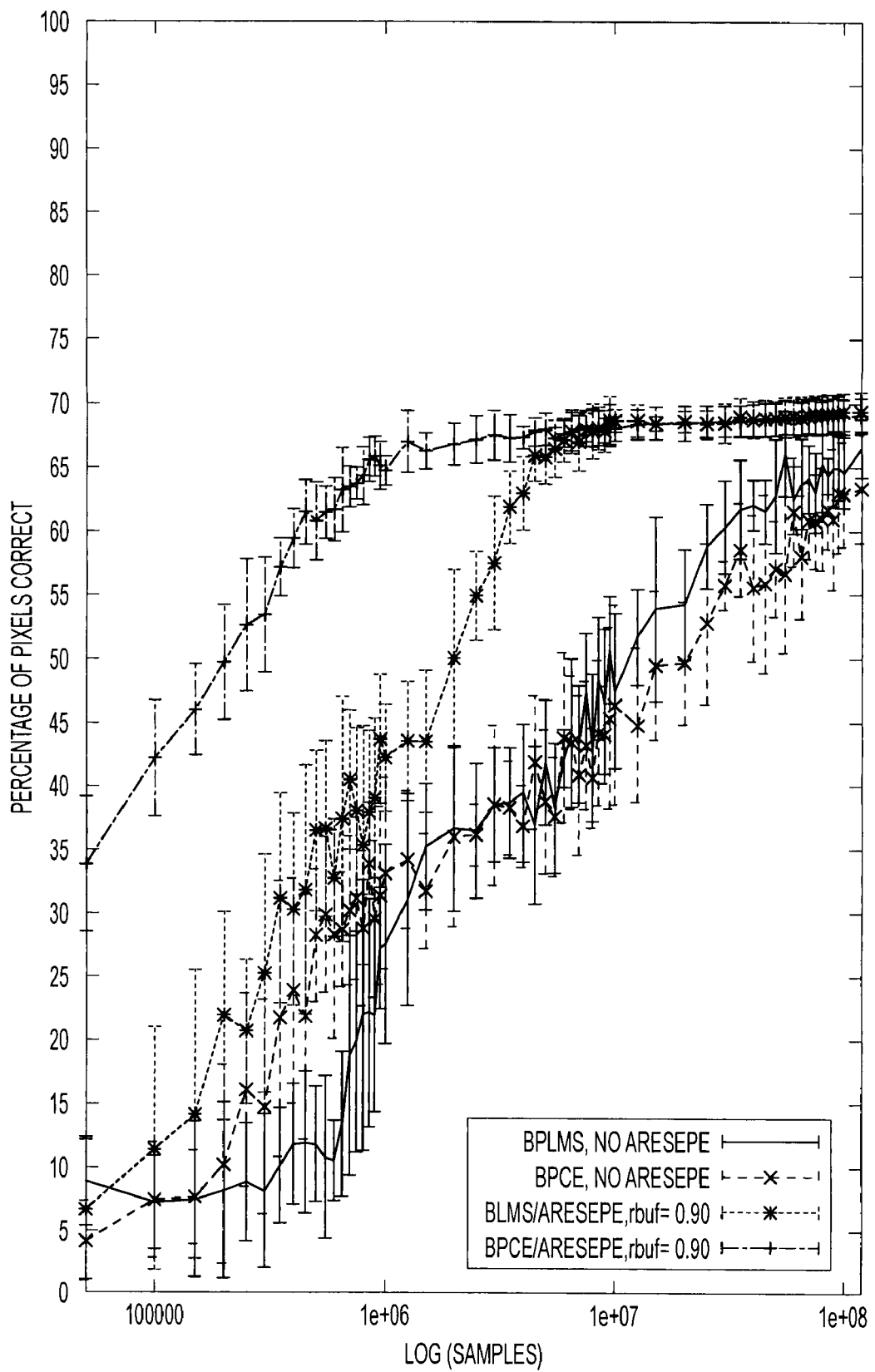
Figure 2C:
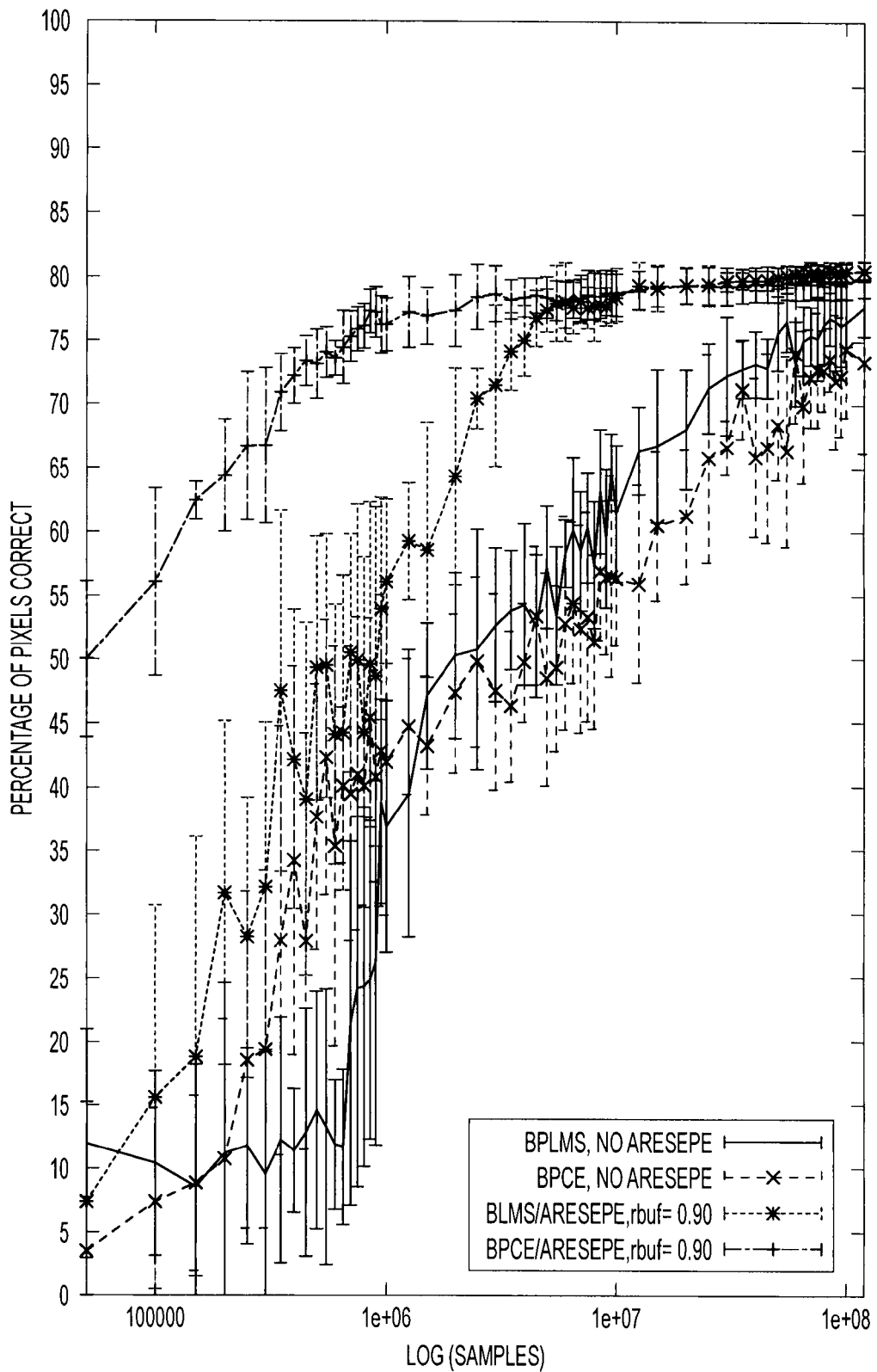

Although performance was measured for each set every 50,000 samples (updates), the tables show only a set of highlighted points since trials were run to $1.2 \times 10^8$ updates. The tables portray the mean and standard deviation of the total accuracy over all pixels for the nineteen categories in Table I; ten trials were performed for each parameter setting listed. Notice that the convergence rates, steadily improve up to about $r_{err\ buffer}=0.90$. Beyond that convergence improvements level off. Full convergence curves (mean and error bars portraying the standard deviation) are shown in FIG. 2 for BPLMS and BPCE with ARESEPE at $r_{err\ buffer}=0.90$ and without ARESEPE ($r_{err\ buffer}=0.0$).

Notice that the asymptotic portion of the curve for the Sequestered Test Set is reached around $1\times10^6$ samples for BPCE at $r_{err\ buffer}=0.9$, while the same level of expected performance is still not achieved even at $1\times10^8$ samples when ARESEPE is not used. Thus convergence rate has been accelerated by more than a factor of 100 (20 db) using ARESEPE. Also note that BPLMS with ARESEPE always converges more slowly than BPCE with ARESEPE (Tables II-IV, V-VII, and FIG. 2), except at $r_{err\ buffer}=0.0$ (without ARESEPE) where the BPCE curve initially rises faster, and then converges marginally more slowly in the asymptotic portion of the curves. When ARESEPE is used, the faster convergence of BPCE compared to BPLMS is probably due to the fact that BPCE spends less time in the vicinity of local minima than BPLMS, owing to the form of the gradient used in the stochastic gradient descent (Richard and Lippman, 1991; "A Credit Assignment Approach to Fusing Classifiers of Multi-Season Hyperspectral Imagery," C. M. Bachmann, M. H. Bettenhausen, R. A. Fusina, T. F. Donato, A. L. Russ, J. Burke, G. M. Lamela, W. Joseph Rhea, B. R. Truitt, J. H. Porter, *IEEE Trans. Geosci. Rem. Sens.*, Vol. 41, No. 11, pp. 2488-2499, November, 2003).

The buffer size was also varied, revealing that there were two distinctly different ranges of buffer sizes that worked well. Tables VIII-X show accuracies at $r_{err\ buffer}=0.5$ for varying buffer sizes as a function of the number of updates. When the buffer size was between 2500-3600 samples, this was optimal. Likewise, convergence rate was nearly as good for a buffer size of 625 samples. In the former case, the buffer size is large enough to represent all possible errors, while a size of 625 was comparable to the number of distinct, erroneous patterns when the distribution of the buffer was probed in the early stages of training. The small buffer is more agile (due to its FIFO nature) than buffer sizes of 1600 samples; likewise, success is achieved at buffer sizes of 2500-3600, because the buffer readily encompasses all possible sources of error.

TABLE V

Training Set: % Accuracy vs Updates(Samples)
BPLMS, $P_{baseline\ probability} = 0.5$, Buffer Size = 3600
Varying $r_{err\ buffer}$ (0.0-0.9)

| Updates | 0.0 | 0.25 | 0.35 | 0.5 | 0.9 |
|---|---|---|---|---|---|
| 0.0e+00 | 5.45 +/− 4.91 | 6.52 +/− 4.27 | 3.77 +/− 3.45 | 7.34 +/− 4.77 | 4.61 +/− 3.98\ |
| 5.0e+04 | 9.54 +/− 3.62 | 8.50 +/− 3.35 | 10.05 +/− 1.40 | 7.53 +/− 3.92 | 8.03 +/− 5.54\ |
| 1.0e+05 | 8.60 +/− 3.16 | 7.82 +/− 4.71 | 6.34 +/− 4.21 | 6.49 +/− 4.77 | 13.77 +/− 10.34\ |
| 2.5e+05 | 10.48 +/− 3.45 | 8.42 +/− 2.82 | 12.12 +/− 6.92 | 9.85 +/− 3.15 | 24.81 +/− 6.27\ |
| 5.0e+05 | 14.00 +/− 4.29 | 19.90 +/− 9.34 | 17.15 +/− 5.84 | 19.69 +/− 4.18 | 41.03 +/− 7.44\ |
| 7.5e+05 | 21.78 +/− 8.58 | 30.00 +/− 7.95 | 31.45 +/− 9.35 | 25.47 +/− 8.20 | 46.33 +/− 9.35\ |
| 1.0e+06 | 29.01 +/− 5.22 | 35.76 +/− 7.09 | 36.03 +/− 7.02 | 36.33 +/− 11.74 | 52.60 +/− 5.75\ |
| 2.5e+06 | 43.00 +/− 4.71 | 49.48 +/− 4.36 | 51.92 +/− 7.60 | 58.90 +/− 6.35 | 73.27 +/− 2.81\ |
| 5.0e+06 | 47.91 +/− 4.55 | 64.38 +/− 5.44 | 68.09 +/− 8.76 | 75.55 +/− 3.79 | 87.53 +/− 2.02\ |
| 7.5e+06 | 56.90 +/− 5.54 | 75.57 +/− 2.98 | 76.04 +/− 5.73 | 84.55 +/− 4.74 | 93.87 +/− 0.96\ |
| 1.0e+07 | 59.09 +/− 5.61 | 79.60 +/− 5.65 | 83.12 +/− 4.06 | 88.36 +/− 2.29 | 96.88 +/− 0.59\ |
| 2.5e+07 | 72.24 +/− 3.38 | 91.37 +/− 3.22 | 97.46 +/− 1.03 | 99.01 +/− 0.61 | 99.85 +/− 0.03\ |
| 5.0e+07 | 79.61 +/− 3.52 | 99.53 +/− 0.27 | 99.75 +/− 0.14 | 99.85 +/− 0.06 | 99.91 +/− 0.03\ |
| 1.0e+08 | 84.78 +/− 3.28 | 99.89 +/− 0.05 | 99.89 +/− 0.03 | 99.90 +/− 0.04 | 99.91 +/− 0.03\ |
| 1.2e+08 | 87.89 +/− 1.87 | 99.90 +/− 0.04 | 99.88 +/− 0.03 | 99.89 +/− 0.04 | 99.92 +/− 0.03\ |

TABLE VI

Cross-Validation Set: % Accuracy vs Updates(Samples)
BPLMS, $P_{baseline\ probability} = 0.5$, Buffer Size = 3600
Varying $r_{err\ buffer}$ (0.0-0.9)

| Updates | 0.0 | 0.25 | 0.35 | 0.5 | 0.9 |
|---|---|---|---|---|---|
| 0.0e+00 | 5.05 +/− 8.18 | 7.45 +/− 8.42 | 4.40 +/− 4.90 | 7.92 +/− 8.32 | 2.72 +/− 3.56\ |
| 5.0e+04 | 11.98 +/− 9.00 | 8.19 +/− 4.15 | 9.93 +/− 2.72 | 6.40 +/− 4.75 | 7.39 +/− 7.87\ |
| 1.0e+05 | 10.43 +/− 7.27 | 7.67 +/− 8.05 | 7.88 +/− 8.76 | 5.40 +/− 5.19 | 15.60 +/− 15.11\ |
| 2.5e+05 | 11.79 +/− 7.72 | 6.22 +/− 4.40 | 12.58 +/− 12.23 | 8.76 +/− 4.70 | 28.19 +/− 11.03\ |
| 5.0e+05 | 14.57 +/− 9.33 | 21.14 +/− 15.30 | 17.16 +/− 4.76 | 16.54 +/− 8.60 | 49.31 +/− 10.35\ |
| 7.5e+05 | 24.14 +/− 15.61 | 34.80 +/− 16.59 | 38.52 +/− 15.42 | 25.16 +/− 12.43 | 49.90 +/− 12.25\ |
| 1.0e+06 | 36.85 +/− 9.86 | 46.77 +/− 7.90 | 40.86 +/− 11.83 | 42.66 +/− 15.11 | 56.08 +/− 6.46\ |
| 2.5e+06 | 50.78 +/− 9.41 | 50.49 +/− 8.27 | 55.85 +/− 7.98 | 59.07 +/− 8.13 | 70.46 +/− 2.38\ |
| 5.0e+06 | 57.26 +/− 4.80 | 62.85 +/− 6.20 | 67.85 +/− 4.82 | 71.43 +/− 2.92 | 77.44 +/− 1.69\ |
| 7.5e+06 | 60.35 +/− 4.31 | 72.58 +/− 3.24 | 69.86 +/− 5.76 | 74.22 +/− 2.98 | 77.63 +/− 1.62\ |
| 1.0e+07 | 61.45 +/− 5.37 | 72.90 +/− 3.15 | 76.23 +/− 2.80 | 78.15 +/− 2.26 | 78.45 +/− 1.85\ |
| 2.5e+07 | 71.33 +/− 3.54 | 78.13 +/− 2.31 | 80.14 +/− 1.40 | 81.68 +/− 1.73 | 79.48 +/− 1.52\ |
| 5.0e+07 | 75.68 +/− 2.94 | 81.16 +/− 0.76 | 81.67 +/− 0.82 | 81.55 +/− 1.18 | 80.05 +/− 0.83\ |
| 1.0e+08 | 76.51 +/− 1.87 | 81.32 +/− 0.58 | 81.10 +/− 0.74 | 82.01 +/− 1.18 | 80.49 +/− 0.82\ |
| 1.2e+08 | 77.71 +/− 2.28 | 81.41 +/− 0.45 | 81.14 +/− 0.77 | 81.90 +/− 1.18 | 80.56 +/− 0.78\ |

TABLE VII

Sequestered Test Set: % Accuracy vs Updates(Samples)
BPLMS, $P_{baseline\ probability} = 0.5$, Buffer Size = 3600
Varying $r_{err\ buffer}$ (0.0-0.9)

| Updates | 0.0 | 0.25 | 0.35 | 0.5 | 0.9 |
|---|---|---|---|---|---|
| 0.0e+00 | 4.58 +/− 4.45 | 6.30 +/− 5.30 | 4.85 +/− 4.93 | 5.90 +/− 4.52 | 4.05 +/− 4.81\ |
| 5.0e+04 | 8.90 +/− 3.52 | 6.98 +/− 2.52 | 7.84 +/− 1.31 | 6.27 +/− 4.45 | 6.64 +/− 5.58\ |
| 1.0e+05 | 7.23 +/− 3.69 | 7.41 +/− 5.25 | 5.58 +/− 4.59 | 4.81 +/− 3.45 | 11.42 +/− 9.58\ |
| 2.5e+05 | 8.84 +/− 4.66 | 7.01 +/− 2.41 | 10.42 +/− 6.96 | 8.36 +/− 1.94 | 20.68 +/− 5.67\ |
| 5.0e+05 | 11.84 +/− 4.53 | 18.12 +/− 9.54 | 14.39 +/− 5.74 | 16.08 +/− 5.12 | 36.48 +/− 6.32\ |
| 7.5e+05 | 19.88 +/− 8.68 | 27.47 +/− 10.81 | 27.29 +/− 9.60 | 21.85 +/− 9.45 | 38.03 +/− 6.57\ |
| 1.0e+06 | 27.56 +/− 7.86 | 34.84 +/− 7.80 | 32.80 +/− 5.64 | 32.22 +/− 9.80 | 42.23 +/− 4.24\ |
| 2.5e+06 | 36.48 +/− 5.30 | 40.36 +/− 4.26 | 41.53 +/− 3.80 | 47.31 +/− 7.27 | 54.90 +/− 3.48\ |
| 5.0e+06 | 41.86 +/− 4.94 | 52.17 +/− 6.79 | 53.46 +/− 5.39 | 58.26 +/− 2.97 | 65.80 +/− 2.10\ |
| 7.5e+06 | 47.45 +/− 4.52 | 60.12 +/− 3.32 | 58.82 +/− 4.12 | 63.89 +/− 3.77 | 67.97 +/− 1.27\ |
| 1.0e+07 | 47.46 +/− 6.07 | 62.30 +/− 3.29 | 64.12 +/− 2.47 | 66.91 +/− 2.58 | 68.66 +/− 0.87\ |
| 2.5e+07 | 58.81 +/− 3.32 | 67.15 +/− 2.28 | 69.07 +/− 1.22 | 69.76 +/− 1.64 | 68.45 +/− 1.02\ |
| 5.0e+07 | 62.78 +/− 4.47 | 69.11 +/− 0.96 | 69.49 +/− 0.68 | 69.64 +/− 1.21 | 68.88 +/− 1.34\ |
| 1.0e+08 | 64.61 +/− 2.78 | 69.46 +/− 1.14 | 69.72 +/− 1.06 | 69.80 +/− 1.05 | 69.36 +/− 1.44\ |
| 1.2e+08 | 66.51 +/− 2.30 | 69.57 +/− 1.10 | 69.63 +/− 0.99 | 69.90 +/− 1.17 | 69.38 +/− 1.51\ |

TABLE VIII

Training Set: % Accuracy vs Updates(Samples)
BPCE,, $P_{baseline\ probability} = 0.5$, $r_{err\ buffer} = 0.5$$
Varying Buffer Size (No. of Samples) Between 25-3600

| Updates | 25 | 100 | 225 | 400 | 625 | 1600 | 2500 | 3600 |
|---|---|---|---|---|---|---|---|---|
| 0.0e+00 | 3.78 +/− 3.68 | 5.84 +/− 4.47 | 5.31 +/− 3.47 | 4.58 +/− 3.47 | 5.55 +/− 3.58 | 5.19 +/− 5.32 | 7.08 +/− 3.76 | 6.53 +/− 5.13\ |
| 5.0e+04 | 8.65 +/− 2.68 | 9.52 +/− 4.89 | 17.63 +/− 10.50 | 17.81 +/− 7.92 | 20.29 +/− 8.53 | 15.38 +/− 6.90 | 19.66 +/− 7.43 | 19.01 +/− 10.99\ |
| 1.0e+05 | 6.75 +/− 4.42 | 15.71 +/− 9.53 | 26.64 +/− 10.52 | 30.32 +/− 7.27 | 38.33 +/− 8.77 | 24.43 +/− 9.18 | 34.51 +/− 8.51 | 28.09 +/− 11.23\ |
| 2.5e+05 | 15.55 +/− 8.69 | 26.92 +/− 8.63 | 34.03 +/− 4.85 | 38.88 +/− 10.28 | 43.80 +/− 6.92 | 35.65 +/− 7.73 | 44.82 +/− 7.07 | 47.39 +/− 8.75\ |
| 5.0e+05 | 27.78 +/− 6.26 | 35.21 +/− 3.49 | 41.70 +/− 7.49 | 47.37 +/− 7.29 | 57.38 +/− 8.02 | 44.96 +/− 5.62 | 65.06 +/− 5.06 | 63.21 +/− 9.83\ |
| 7.5e+05 | 28.96 +/− 4.82 | 39.38 +/− 4.99 | 39.35 +/− 5.29 | 60.82 +/− 10.16 | 69.56 +/− 6.70 | 52.65 +/− 5.49 | 73.16 +/− 5.17 | 73.70 +/− 4.92\ |
| 1.0e+06 | 35.85 +/− 4.06 | 37.92 +/− 6.24 | 39.08 +/− 10.54 | 68.09 +/− 6.05 | 74.74 +/− 6.35 | 54.62 +/− 4.84 | 80.42 +/− 2.44 | 79.94 +/− 3.13\ |
| 2.5e+06 | 44.04 +/− 3.80 | 43.12 +/− 5.28 | 66.88 +/− 6.85 | 87.15 +/− 3.49 | 91.37 +/− 1.99 | 73.15 +/− 4.04 | 90.45 +/− 3.34 | 90.12 +/− 2.06\ |
| 5.0e+06 | 43.94 +/− 8.48 | 57.14 +/− 9.75 | 89.94 +/− 2.82 | 96.60 +/− 1.29 | 97.54 +/− 1.51 | 83.41 +/− 3.45 | 97.74 +/− 1.10 | 96.30 +/− 1.43\ |
| 7.5e+06 | 50.02 +/− 9.28 | 58.36 +/− 15.15 | 96.08 +/− 2.26 | 98.96 +/− 0.58 | 99.20 +/− 0.40 | 84.23 +/− 3.63 | 98.97 +/− 0.54 | 98.56 +/− 0.71\ |
| 1.0e+07 | 54.00 +/− 6.59 | 65.50 +/− 13.69 | 98.47 +/− 1.02 | 99.58 +/− 0.17 | 99.69 +/− 0.12 | 86.77 +/− 2.03 | 99.59 +/− 0.21 | 99.30 +/− 0.37\ |
| 2.5e+07 | 63.62 +/− 9.84 | 90.05 +/− 9.23 | 99.81 +/− 0.14 | 99.86 +/− 0.06 | 99.88 +/− 0.04 | 92.36 +/− 1.86 | 99.87 +/− 0.06 | 99.87 +/− 0.05\ |
| 5.0e+07 | 73.24 +/− 10.13 | 99.29 +/− 1.04 | 99.87 +/− 0.04 | 99.87 +/− 0.05 | 99.90 +/− 0.02 | 94.56 +/− 2.07 | 99.88 +/− 0.04 | 99.90 +/− 0.03\ |
| 1.0e+08 | 81.02 +/− 7.35 | 99.89 +/− 0.04 | 99.86 +/− 0.05 | 99.88 +/− 0.05 | 99.91 +/− 0.02 | 96.99 +/− 1.53 | 99.89 +/− 0.05 | 99.91 +/− 0.03\ |
| 1.2e+08 | 83.38 +/− 11.11 | 99.89 +/− 0.05 | 99.88 +/− 0.04 | 99.90 +/− 0.03 | 99.91 +/− 0.02 | 97.94 +/− 0.60 | 99.88 +/− 0.05 | 99.90 +/− 0.03\ |

TABLE IX

Cross-Validation Set: % Accuracy vs Updates(Samples)
BPCE,, $P_{baseline\ probability} = 0.5$, $r_{err\ buffer} = 0.5$$
Varying Buffer Size (No. of Samples) Between 25-3600

| Updates | 25 | 100 | 225 | 400 | 625 | 1600 | 2500 | 3600 |
|---|---|---|---|---|---|---|---|---|
| 0.0e+00 | 2.30 +/− 3.61 | 5.24 +/− 4.71 | 4.94 +/− 4.21 | 3.19 +/− 3.64 | 4.99 +/− 4.62 | 6.34 +/− 8.78 | 6.50 +/− 5.08 | 10.24 +/− 12.20\ |
| 5.0e+04 | 8.75 +/− 3.81 | 9.17 +/− 4.79 | 21.05 +/− 15.17 | 22.14 +/− 15.27 | 22.80 +/− 11.95 | 20.54 +/− 11.16 | 25.64 +/− 16.03 | 21.95 +/− 15.35\ |
| 1.0e+05 | 5.80 +/− 8.47 | 15.14 +/− 13.92 | 31.24 +/− 15.10 | 36.04 +/− 12.06 | 43.39 +/− 10.50 | 32.02 +/− 15.57 | 41.00 +/− 13.83 | 35.63 +/− 17.06\ |
| 2.5e+05 | 19.03 +/− 16.01 | 28.75 +/− 14.26 | 43.20 +/− 7.69 | 41.22 +/− 12.77 | 45.42 +/− 14.42 | 44.33 +/− 13.59 | 46.20 +/− 15.43 | 52.38 +/− 10.16\ |
| 5.0e+05 | 37.18 +/− 6.74 | 40.58 +/− 11.26 | 48.45 +/− 6.96 | 45.12 +/− 12.09 | 55.33 +/− 8.75 | 50.85 +/− 9.41 | 61.99 +/− 4.78 | 63.91 +/− 7.93\ |
| 7.5e+05 | 36.53 +/− 9.24 | 49.83 +/− 5.27 | 43.38 +/− 9.30 | 62.21 +/− 8.46 | 66.65 +/− 4.76 | 57.02 +/− 3.63 | 68.04 +/− 4.07 | 67.96 +/− 3.27\ |
| 1.0e+06 | 43.41 +/− 4.74 | 49.42 +/− 7.42 | 45.47 +/− 11.71 | 65.93 +/− 2.95 | 69.51 +/− 6.42 | 58.26 +/− 5.20 | 72.18 +/− 3.61 | 71.93 +/− 2.16\ |
| 2.5e+06 | 52.83 +/− 5.36 | 47.21 +/− 8.20 | 64.16 +/− 4.60 | 74.93 +/− 2.56 | 77.06 +/− 2.48 | 70.39 +/− 3.21 | 75.60 +/− 2.82 | 77.07 +/− 2.24\ |
| 5.0e+06 | 53.09 +/− 5.92 | 63.81 +/− 7.70 | 76.23 +/− 3.61 | 78.73 +/− 1.68 | 78.94 +/− 2.32 | 75.01 +/− 4.21 | 78.66 +/− 1.00 | 78.84 +/− 1.50\ |
| 7.5e+06 | 54.62 +/− 8.24 | 61.27 +/− 9.84 | 77.86 +/− 1.79 | 79.30 +/− 1.32 | 79.15 +/− 1.15 | 77.29 +/− 2.62 | 78.91 +/− 1.68 | 78.71 +/− 2.24\ |
| 1.0e+07 | 59.12 +/− 5.24 | 67.05 +/− 8.06 | 79.42 +/− 1.31 | 79.63 +/− 0.97 | 79.51 +/− 0.86 | 78.13 +/− 2.72 | 79.75 +/− 1.29 | 79.42 +/− 1.50\ |

TABLE IX-continued

Cross-Validation Set: % Accuracy vs Updates(Samples)
BPCE,, $P_{baseline\ probability} = 0.5$, $r_{err\ buffer} = 0.5\$$
Varying Buffer Size (No. of Samples) Between 25-3600

| Updates | 25 | 100 | 225 | 400 | 625 | 1600 | 2500 | 3600 |
|---|---|---|---|---|---|---|---|---|
| 2.5e+07 | 62.64 +/− 7.30 | 74.05 +/− 5.93 | 80.31 +/− 1.78 | 80.61 +/− 1.45 | 80.05 +/− 0.91 | 79.49 +/− 1.82 | 80.52 +/− 0.86 | 79.90 +/− 1.00\ |
| 5.0e+07 | 68.08 +/− 7.41 | 80.20 +/− 2.00 | 80.94 +/− 1.34 | 81.11 +/− 1.42 | 80.68 +/− 1.19 | 80.08 +/− 1.22 | 80.58 +/− 0.84 | 79.89 +/− 1.04\ |
| 1.0e+08 | 71.59 +/− 3.77 | 80.57 +/− 1.37 | 81.15 +/− 1.04 | 81.09 +/− 1.48 | 80.97 +/− 1.04 | 80.79 +/− 1.29 | 80.84 +/− 0.89 | 80.19 +/− 1.10\ |
| 1.2e+08 | 74.21 +/− 5.23 | 80.64 +/− 1.38 | 80.98 +/− 1.09 | 81.14 +/− 1.41 | 80.98 +/− 0.91 | 81.53 +/− 1.30 | 80.83 +/− 0.85 | 80.08 +/− 0.99\ |

TABLE X

Sequestered TestSet: % Accuracy vs Updates(Samples)
BPCE,, $P_{baseline\ probability} = 0.5$, $r_{err\ buffer} = 0.5\$$
Varying Buffer Size (No. of Samples) Between 25-3600

| Updates | 25 | 100 | 225 | 400 | 625 | 1600 | 2500 | 3600 |
|---|---|---|---|---|---|---|---|---|
| 0.0e+00 | 2.90 +/− 2.53 | 6.60 +/− 4.46 | 5.62 +/− 4.27 | 3.42 +/− 2.61 | 7.00 +/− 3.90 | 4.80 +/− 4.96 | 5.44 +/− 2.60 | 6.86 +/− 6.09\ |
| 5.0e+04 | 7.70 +/− 3.66 | 7.87 +/− 4.11 | 16.37 +/− 10.08 | 15.80 +/− 9.11 | 16.89 +/− 6.55 | 18.25 +/− 8.59 | 18.61 +/− 7.71 | 17.73 +/− 11.10\ |
| 1.0e+05 | 5.07 +/− 4.42 | 13.66 +/− 9.21 | 23.57 +/− 10.63 | 28.61 +/− 8.16 | 32.18 +/− 7.89 | 23.52 +/− 9.19 | 30.52 +/− 6.67 | 26.46 +/− 10.42\ |
| 2.5e+05 | 16.25 +/− 11.54 | 24.35 +/− 8.89 | 31.06 +/− 5.28 | 33.20 +/− 10.22 | 34.66 +/− 7.85 | 34.60 +/− 7.44 | 34.58 +/− 6.86 | 39.77 +/− 5.05\ |
| 5.0e+05 | 27.63 +/− 4.88 | 31.42 +/− 6.36 | 35.79 +/− 5.40 | 36.94 +/− 5.53 | 45.20 +/− 5.37 | 39.40 +/− 6.80 | 50.60 +/− 4.44 | 49.40 +/− 6.89\ |
| 7.5e+05 | 28.11 +/− 5.59 | 35.31 +/− 4.02 | 33.16 +/− 3.82 | 47.60 +/− 7.89 | 54.99 +/− 6.50 | 44.74 +/− 1.66 | 56.64 +/− 3.23 | 56.39 +/− 4.28\ |
| 1.0e+06 | 32.63 +/− 4.31 | 35.81 +/− 3.77 | 35.38 +/− 8.73 | 58.30 +/− 3.55 | 58.30 +/− 4.16 | 45.65 +/− 3.95 | 61.11 +/− 3.22 | 60.06 +/− 2.35\ |
| 2.5e+06 | 39.56 +/− 4.88 | 38.45 +/− 3.90 | 53.20 +/− 5.71 | 64.61 +/− 1.68 | 66.95 +/− 1.77 | 58.47 +/− 3.72 | 65.96 +/− 2.26 | 66.35 +/− 2.33\ |
| 5.0e+06 | 41.78 +/− 3.76 | 50.69 +/− 7.48 | 65.80 +/− 2.92 | 67.51 +/− 1.90 | 67.65 +/− 1.38 | 64.29 +/− 2.85 | 67.03 +/− 2.09 | 68.27 +/− 0.97\ |
| 7.5e+06 | 44.78 +/− 8.41 | 49.03 +/− 9.57 | 66.36 +/− 2.98 | 68.46 +/− 1.55 | 67.80 +/− 1.52 | 65.76 +/− 4.05 | 67.35 +/− 2.05 | 69.01 +/− 1.22\ |
| 1.0e+07 | 47.05 +/− 5.97 | 54.80 +/− 8.39 | 68.12 +/− 2.65 | 68.34 +/− 1.45 | 68.61 +/− 1.15 | 66.85 +/− 1.39 | 68.28 +/− 2.00 | 69.53 +/− 0.67\ |
| 2.5e+07 | 52.72 +/− 6.91 | 64.40 +/− 4.49 | 69.34 +/− 1.53 | 69.45 +/− 1.81 | 69.07 +/− 1.21 | 69.88 +/− 2.10 | 68.83 +/− 1.72 | 69.70 +/− 1.01\ |
| 5.0e+07 | 57.70 +/− 7.18 | 69.15 +/− 2.43 | 69.64 +/− 1.66 | 69.64 +/− 1.55 | 69.53 +/− 1.05 | 70.15 +/− 1.18 | 69.10 +/− 1.99 | 69.85 +/− 0.86\ |
| 1.0e+08 | 60.40 +/− 5.68 | 68.84 +/− 2.02 | 69.75 +/− 1.97 | 69.68 +/− 1.35 | 69.73 +/− 1.25 | 70.58 +/− 1.63 | 69.51 +/− 1.69 | 69.88 +/− 1.18\ |
| 1.2e+08 | 62.76 +/− 6.71 | 69.02 +/− 1.54 | 69.52 +/− 1.74 | 69.92 +/− 1.40 | 69.53 +/− 1.08 | 71.04 +/− 0.86 | 69.31 +/− 1.94 | 70.06 +/− 1.13\ |

Figure 3:
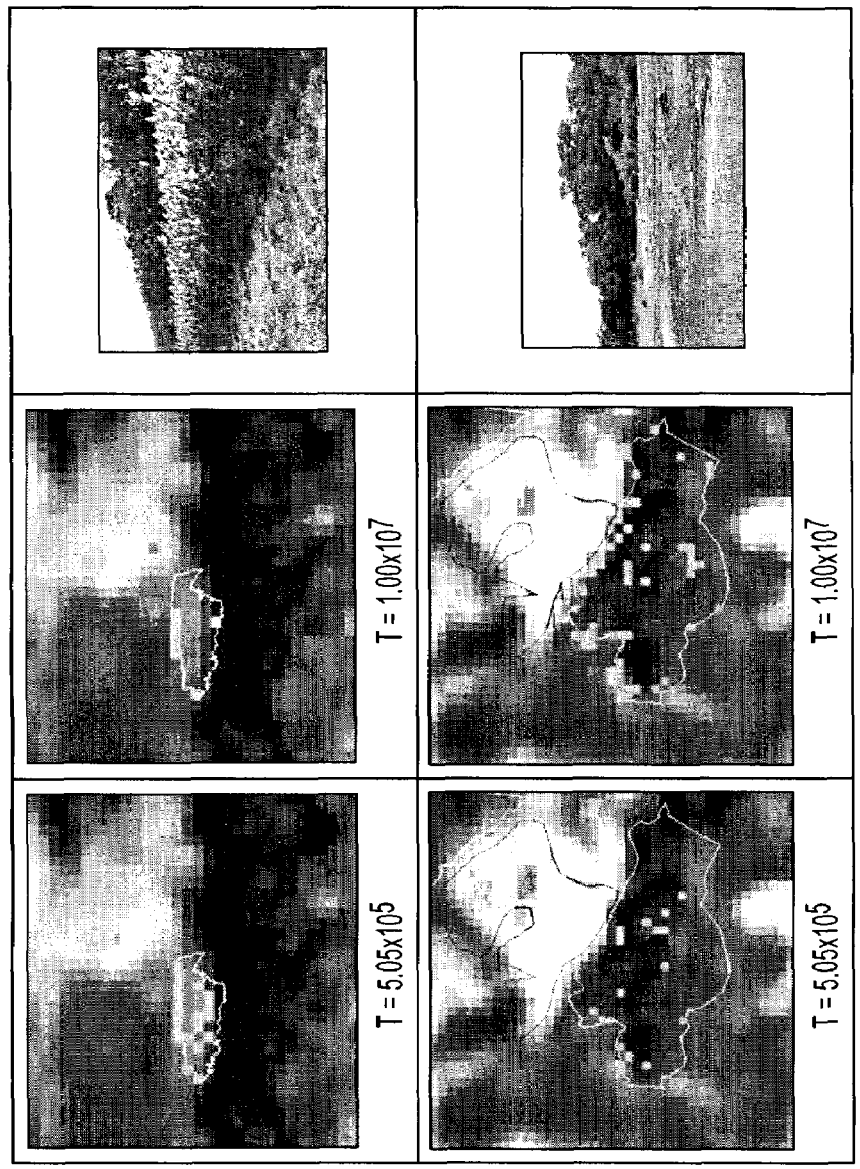
FIG. 3 is a view of the internal function of the error-based data resampling buffer that is central to the ARESEPE method according to the invention.
Figure 4:
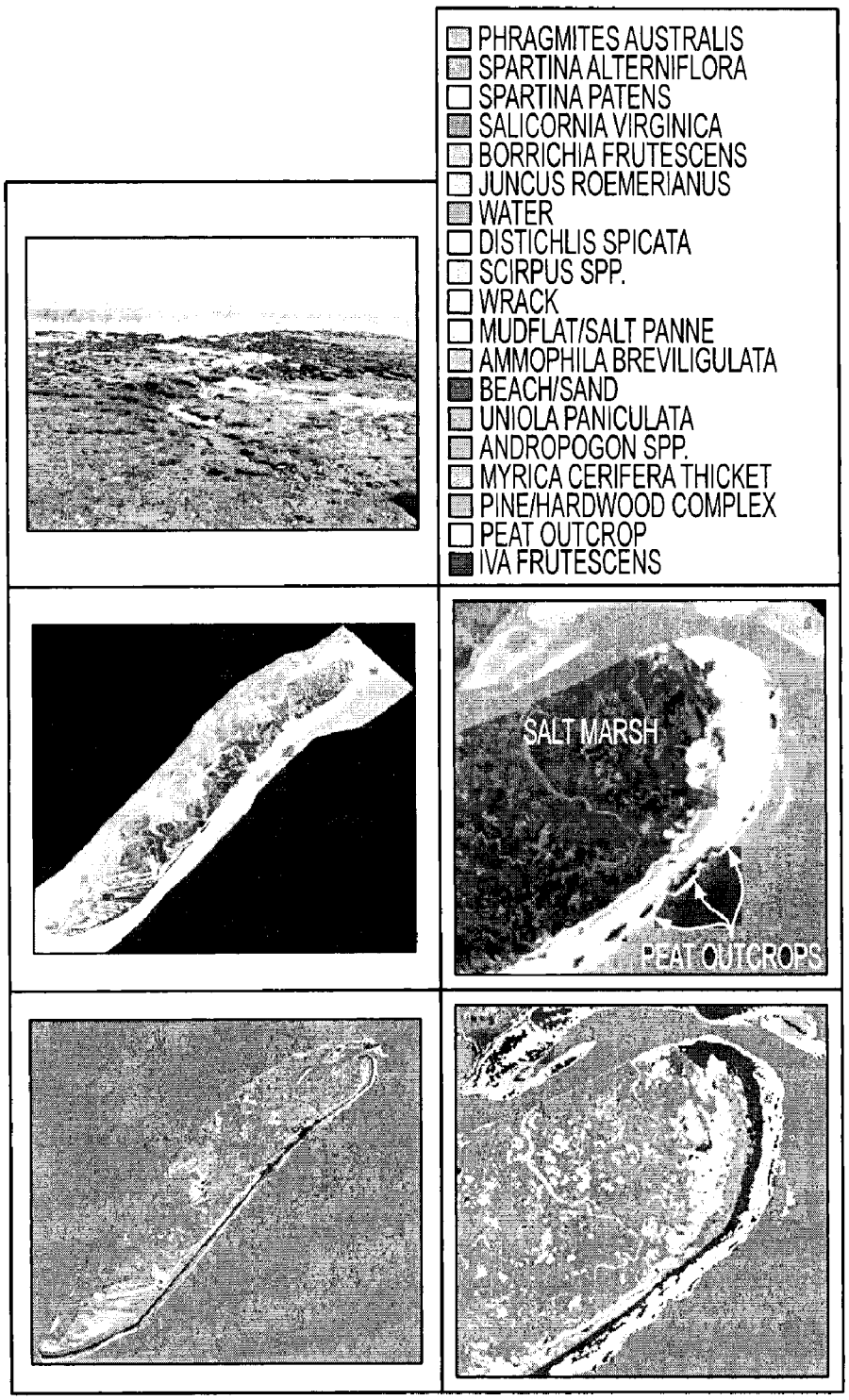
FIG. 4 is a graph illustrating a typical classification product produced using ARESEPE with hyperspectral imagery as inputs according to the invention

I also examined the distribution of pixels in the resampling buffer to understand its evolution. Overall, I found that it progressively includes a greater percentage of boundary pixels as time (number of updates) increases. FIG. 3 shows two regions derived from the PROBE2 scene (FIG. 4). DGPS ground surveyed regions of interest (ROI's) used in the study are highlighted as colored lines, and the contents of the resampling buffer are shown in the early and late stages of training. FIG. 3 shows that although core pixels exist in the buffer at both early and later times, a much large percentage of boundary pixels occurs at later times as the model attempts to refine the decision boundaries. Likewise, the plots in FIG. 2 show that using ARESEPE significantly reduces the variance of the accuracy curves, especially in the later stages of optimization. This is another indication that ARESEPE is forcing the model to examine only those patterns actually causing error near the boundaries, rather than distant patterns which might otherwise lead to larger changes in decision vectors and thus greater oscillation near the minimum. Thus, the properties of the ARESEPE resampling buffer are consistent with those originally recommended in "The significance of border training patterns in classification by a feedforward neural network using back propagation learning," G. M. Foody, *Int. J. Remote Sensing*, Vol. 20, No. 18, pp. 3549-3562, 1999.

A typical land-cover classification obtained with BPCE and ARESEPE is shown in FIG. 4. This is the result of applying the model trained and tested using the PROBE2 spectra labeled from my ground surveys. After optimization, the model was applied to the entire scene to obtain the land-cover classification shown. Convergence improvements are obtained using ARESEPE. In fact, using ARESEPE with $r_{err\ buffer} = 0.9$ allowed me to reach the asymptotic region of the performance curves around $\sim 1 \times 10^6$ samples in roughly 12 minutes on an AMD Athlon XP 1800+. Although I terminated the experiments at $\sim 1.2 \times 10^8$ samples (updates), it clearly can be seen that waiting a hundred times longer does not give me large improvements. Ultimately, I had to determine the time at which the benefits of additional performance increases were not worth the additional processing time; this is the notion of a "patience parameter". For me, this was ~24 hours; however, many real-world applications demand rapid response, and the ability to reach the asymptotic portion of the accuracy curve in under 12 minutes using ARESEPE vs 24 hours without ARESEPE is thus a significant advantage.

The invention therefore provides a generalized approach to accelerating the convergence rate of statistical classifiers. Although the approach was illustrated with popular neural network algorithms, BPLMS and BPCE, my new algorithm, ARESEPE, could be applied to any statistical classifier that uses stochastic optimization to obtain a model. Using BPCE with ARESEPE led to a two orders of magnitude improvement in convergence rate. The fact that ARESEPE is an online algorithm with minimal computational overhead and storage requirements allows me to apply the algorithm to high-dimensional data sets such as the PROBE2 data (which had 124 dimensions) used in this study. Most of the algorithms previously described were too inefficient to be applied to the large high-dimensional imagery databases that are found in hyperspectral applications. This has significant implications for many algorithms, and in particular for many commercially available software packages that use stochastic optimization techniques in their implementations of vector quantization, neural networks, and other statistical classifiers. ARESEPE works because it identifies error-prone patterns that should be revisited more frequently. In the latter stages of optimization, this is usually near the decision boundaries of the classifiers where errors are most likely, a fact which was confirmed by examining the contents of the resampling buffer. In addition to improving convergence rate, ARESEPE greatly reduced the variance of the accuracy curves, especially in the later stages of optimization. This is another indication that ARESEPE forces the model to examine only those patterns actually causing error near the boundaries. ARESEPE requires minimal overhead, a simple buffer that is resampled with a user-specified rate along with the original input data stream. Computational overhead is also minimal because the buffer entry criterion is based on a simple asymptotic formula for degree of mis-classification. ARESEPE also represents an improvement over many of the previously described algorithms for active sampling because the resampling criterion (buffer entry criterion) only examines degree of mis-classification; this also means that it will be more efficient in the early stages of optimization than algorithms that only examine patterns near the decision boundary, which is a more appropriate end-game strategy.

Obviously many modifications and variations of the present invention are possible in the light of the above teachings. It is therefore to be understood that the scope of the invention should be determined by referring to the following appended claims.

I claim:

1. A method for classifying and sorting image input data in an image data stream, wherein the image input data includes data representative of at least one physical object, comprising:
    a) sampling the image input data with an input control;
    b) comparing one or more classes of the sampled image input data with initially preset data classifications that constitute a baseline for determining mis-classification of data patterns;
    c) determining a degree of mis-classification of the image input data and assigning a probability proportional to the degree of mis-classification thereto as a criterion for storing the input in a resampling buffer;
    d) entering data patterns causing mis-classification in a resampling buffer with a probability value proportional to the degree of mis-classification;
    e) comparing the data patterns to a ground truth source and aligning the data patterns with their associated data pattern labels employing the same mis-classification probability as applied to the resampling buffer to form a set of training data; and
    f) updating an adaptive classifier to correlate with the training data; and
    g) repeating steps a)-f) until a sufficient degree of data classification optimization is realized, thereby transforming the image input data into an optimized image output data set with an improved representation of said at least one physical object.

2. A method as in claim 1, wherein an image data stream input sampling rate, a resampling buffer input rate, and a resampling buffer size are parameters defined and adjustable by a user.

3. A method as in claim 1, wherein the degree of mis-classification is determined by the function $$d(x) = -f_i + [(1/(M-1))S_{j,j \neq i} f_j(x)^n]^{(1/n)}$$

where $d(x)$ is an M-category discriminant function and index i is the true category associated with input sample vector x, where the asymptotic limit as $n \rightarrow \infty$ is $$d_\infty(x) = f_{max} - f_i$$

where $f_{max}$ is the maximum responding discriminant function not equal to the true discriminant function, and where a positive value of $d_\infty(x)$ represents the amount by which a winning discriminant function is larger than a true discriminant function.

4. A method as in claim 3, further comprising calculating a quantity:

$$d_j = f_j - f_i \quad (4)$$

for each category node j, where i is an index of a true category, and then computing $$d_{max} = max_j d_j = d_\infty(x) \quad (5)$$

where a sign of $d_{max}$ indicates whether the pattern was misclassified and thereby automatically determining the quantity $d_\infty(x)$, and whereby if a pattern is misclassified, a probability of entering the resampling buffer is set proportional to $d_{max}$, where $d_{max} \in [-1,1]$ if the discriminant functions satisfy the condition $f_i \in [0,1]$, and where there is further included a baseline acceptance probability defined by $$P_{accept} = \theta(d_{max})(P_{baseline\,probability} + (d_{max}/scale)*(1 - P_{baseline\,probability})) \quad (6)$$

where $d_{max}$ is a Heaviside (step) function.

5. A method as in claim 4, wherein scale is set to 1 so that the probability of acceptance is $\in [P_{baseline\,probability}, 1]$.

6. A method as in claim 5, wherein the data comprises remote sensing data.

7. A method as in claim 6, wherein the remote sensing data is hyperspectral imaging data.

8. A method as in claim 1, wherein the data comprises remote sensing data.

9. A method as in claim 8, wherein the remote sensing data is hyperspectral imaging data.

10. A method as in claim 1, wherein the degree of mis-classification is determined by the function $$d(x) = P(C1|x) - P(C0|x)$$

where C0 is a first class, C1 is a second class, and $P(C0|x)$ is a first discriminant function and $P(C1|x)$ is a second discriminant function representing Bayesian posterior probabilities for a sample vector x.

11. An apparatus for classifying and sorting input data in a data stream, comprising:
    a processor having a first input for receiving said input data, a second input, and an output, and wherein said processor includes:
        a classifier input control including said first input and said second input;
        an adaptive classifier;
        a ground truth data input;
        a ground truth resampling buffer; and
        a source data re-sampling buffer,
    wherein said processor is configured for:
    a) sampling the input data with the input control;
    b) comparing one or more classes of the sampled input data with initially preset data classifications that constitute a baseline for determining mis-classification of data patterns;

c) determining a degree of mis-classification of the input data and assigning a probability proportional to the degree of misclassification as a criterion for entry into a resampling buffer thereto;

d) entering data patterns causing mis-classification in a resampling buffer with a probability value proportional to the degree of mis-classification;

e) comparing the data patterns to a ground truth source and aligning the data patterns with their associated data pattern labels employing the same decision outcome based on a mis-classification probability as applied to the resampling buffer to form a set of training data; and f) updating the adaptive classifier to correlate with the training data; and g) repeating steps a)-f) until a sufficient degree of data classification optimization is realized;

whereby an optimized data stream is provided by said processor at said output.

12. An apparatus as in claim 11, wherein a data stream input sampling rate, a resampling buffer input rate, and a resampling buffer size are parameters defined and adjustable by a user.

13. An apparatus as in claim 11, wherein the degree of mis-classification is determined by the function $$d(x) = -f_i + [(1/(M-1))S_{j,j \neq i} f_j(x)^n]^{(1/n)}$$

where $d(x)$ is an M-category discriminant function, index i is the true category associated with input sample vector x, where the asymptotic limit as $n \to \infty$ is $$d_\infty(x) = f_{max} - f_i$$

where $f_{max}$ is the maximum responding discriminant function not equal to the true discriminant function, and where a positive value of $d_\infty(x)$ represents the amount by which a winning discriminant function is larger than a true discriminant function.

14. An apparatus as in claim 13, further comprising calculating a quantity:

$$d_j = f_j - f_i \quad (4)$$

for each category node j, where i is an index of a true category, and then computing $$d_{max} = \max_j d_j = d_\infty(x) \quad (5)$$

where a sign of $d_{max}$ indicates whether the pattern was misclassified and thereby automatically determining the quantity $d_\infty(x)$, and whereby if a pattern is misclassified, a probability of entering the resampling buffer is set proportional to $d_{max}$, where $d_{max} \in [-1,1]$ if the discriminant functions satisfy the condition $f_i \in [0,1]$, and where there is further included a baseline acceptance probability defined by $$P_{accept} = \theta(d_{max})(P_{baseline\,probability} + (d_{max}/\text{scale})*(1 - P_{baseline\,probability})) \quad (6)$$

where $d_{max}$ is a Heaviside (step) function.

15. An apparatus as in claim 14, wherein scale is set to 1 so that the probability of acceptance is $\in [P_{baseline\,probability}, 1]$.

16. An apparatus as in claim 15, wherein the data comprises remote sensing data.

17. An apparatus as in claim 16, wherein the remote sensing data is hyperspectral imaging data.

18. An apparatus as in claim 11, wherein the data comprises remote sensing data.

19. An apparatus as in claim 18, wherein the remote sensing data is hyperspectral imaging data.

20. An apparatus as in claim 11, wherein the degree of mis-classification is determined by the function $$d(x) = P(C1|x) - P(C0|x)$$

where C0 is a first class, C1 is a second class, and $P(C0|x)$ is a first discriminant function and $P(C1|x)$ is a second discriminant function representing Bayesian posterior probabilities for a sample vector x.

* * * * *